(12) United States Patent
Roth

(10) Patent No.: US 12,287,512 B2
(45) Date of Patent: Apr. 29, 2025

(54) TWO LAYER POLARIZATION SPLITTER ROTATOR

(71) Applicant: Cisco Technology, Inc., San Jose, CA (US)

(72) Inventor: Jonathan Edgar Roth, San Mateo, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 201 days.

(21) Appl. No.: 17/902,259

(22) Filed: Sep. 2, 2022

(65) Prior Publication Data
US 2024/0077675 A1   Mar. 7, 2024

(51) Int. Cl.
| | |
|---|---|
| G02B 6/122 | (2006.01) |
| G02B 6/125 | (2006.01) |
| G02B 6/126 | (2006.01) |
| G02B 6/27 | (2006.01) |
| G02B 6/12 | (2006.01) |
| G02B 6/28 | (2006.01) |

(52) U.S. Cl.
CPC ........... *G02B 6/126* (2013.01); *G02B 6/1228* (2013.01); *G02B 6/125* (2013.01); *G02B 6/2773* (2013.01); *G02B 2006/12035* (2013.01); *G02B 2006/12061* (2013.01); *G02B 2006/1215* (2013.01); *G02B 6/2821* (2013.01)

(58) Field of Classification Search
CPC ...... G02B 6/1228; G02B 6/125; G02B 6/126; G02B 6/2773; G02B 6/2821; G02B 2006/12035; G02B 2006/12061; G02B 2006/1215

See application file for complete search history.

(56) References Cited

U.S. PATENT DOCUMENTS

| | | | |
|---|---|---|---|
| 5,418,867 A | 5/1995 | Van Der Tol |
| 5,524,156 A | 6/1996 | Van Der Tol |
| 5,696,856 A | 12/1997 | Van Der Tol |
| 5,878,181 A | 3/1999 | Van Der Tol |
| 7,702,188 B2 | 4/2010 | Little et al. |

(Continued)

FOREIGN PATENT DOCUMENTS

WO   2021/222714 A1   11/2021

OTHER PUBLICATIONS

"GlobalFoundries Silicon Photonics Platform," Global Foundries, Japan SOI Design Workshop, Oct. 25-26, 2018, 16 pages.

(Continued)

*Primary Examiner* — Ryan A Lepisto
(74) *Attorney, Agent, or Firm* — Edell, Shapiro & Finnan, LLC

(57) ABSTRACT

A polarization splitter rotator includes a first lower waveguide and a second lower waveguide disposed on a first layer, the first lower waveguide and the second lower waveguide, in a first portion of the device, widening symmetrically as the first lower waveguide and the second lower waveguide extend from an input end of the device to an output end of the device, and, in a second portion of the device, at least the second lower waveguide widening further, asymmetrically, from the first lower waveguide, and a bus waveguide disposed on a second layer, above the first layer, at least partially overlapping portions of the first lower waveguide and the second lower waveguide.

20 Claims, 8 Drawing Sheets

(56) References Cited

U.S. PATENT DOCUMENTS

| | | | |
|---|---|---|---|
| 8,855,449 | B1 | 10/2014 | Roth |
| 9,091,813 | B2 | 7/2015 | Dallesasse et al. |
| 9,122,006 | B1 | 9/2015 | Roth et al. |
| 9,529,151 | B2 | 12/2016 | Goi et al. |
| 9,817,186 | B2 * | 11/2017 | Kamei ................ G02B 6/1228 |
| 9,874,696 | B2 | 1/2018 | Liu et al. |
| 9,989,702 | B2 * | 6/2018 | Doany ................ G02B 6/125 |
| 10,191,214 | B2 * | 1/2019 | Dong ................ G02B 6/2773 |
| 10,302,866 | B2 * | 5/2019 | Lin ........................ G02B 6/126 |
| 10,345,522 | B2 * | 7/2019 | Daniel ................ G02B 6/1228 |
| 10,488,590 | B2 | 11/2019 | Park et al. |
| 10,667,987 | B2 | 6/2020 | Dumais |
| 10,677,987 | B1 | 6/2020 | Dumais |
| 10,841,012 | B2 | 11/2020 | Wang et al. |
| 11,402,581 | B2 * | 8/2022 | Baba ................ G02B 6/126 |
| 11,409,044 | B2 * | 8/2022 | Su ........................ G02B 6/2773 |
| 11,747,559 | B2 * | 9/2023 | Bian ................ G02B 6/1228 |
| | | | 385/43 |
| 2008/0226224 | A1 | 9/2008 | Blauvelt et al. |
| 2010/0271634 | A1 | 10/2010 | Dominguez Horna et al. |
| 2014/0133796 | A1 | 5/2014 | Dong |
| 2016/0131842 | A1 | 5/2016 | Mahgerefteh et al. |
| 2018/0017732 | A1 * | 1/2018 | Tassaert ............ G02B 6/12004 |
| 2019/0025506 | A1 | 1/2019 | Park |
| 2019/0222309 | A1 * | 7/2019 | Gross ................ H04B 10/85 |
| 2019/0310424 | A1 | 10/2019 | Lamponi et al. |
| 2021/0405308 | A1 | 12/2021 | Bhargava et al. |
| 2023/0251440 | A1 | 8/2023 | Fini et al. |
| 2023/0384519 | A1 | 11/2023 | Huang et al. |
| 2024/0077674 | A1 | 3/2024 | Tambasco et al. |

OTHER PUBLICATIONS

Sean P. Anderson, et al., "Silicon Photonic Polarization-Multiplexing Nanotaper for Chip-to-Fiber Coupling," IEEE Xplore, Journal of Lightwave Technology, JLT-17965-2015.R2, Nov. 2015, 7 pages.

Wesley D. Sacher, et al., "Polarization rotator-splitters in standard active silicon photonics platforms," Optics Express, vol. 22, No. 4, DOI:10.1364/OE.22.003777, Feb. 24, 2014, 10 pages.

Kang Tan, et al., "Three-Dimensional Polarization Splitter and Rotator Based on Multi-Layer Si3N4-On-SOI Platform," IEEE, 978-1-5090-1035-6, Po2.4-1, 2016 International Conference on Optical Mems and Nanophotonics (OMN), Aug. 2016, 2 pages.

Daoxin Dai, et al., "Novel concept for ultracompact polarization splitter-rotator based on silicon nanowires," Optics Express, vol. 19, No. 11, May 23, 2011, 10 pages.

Luis Torrijos Morán, "Photonic applications based on bimodal interferometry in periodic integrated waveguides," Doctoral Thesis, Universitat Politecnica de Valencia, Departamento de Comunicaciones, Jul. 2021, 210 pages.

Ding, et al., "Wideband polarization splitter and rotator with large fabrication tolerance and simple fabrication process," Optics Letters, vol. 38, No. 8, Apr. 15, 2013, 3 pages.

Ma, et al., "Symmetrical polarization splitter/rotator design and application in a polarization insensitive WDM receiver," Optics Express 16053, vol. 23, No. 12, Jun. 15, 2015, 11 pages.

Sacher, et al., "Polarization rotator-splitters and controllers in a Si3N4-on-SOI integrated photonics platform," Optics Express 11167, vol. 22, No. 9, May 5, 2014, 8 pages.

Sacher, et al., "Polarization rotator-splitters in standard active silicon photonics platforms," Optics Express 3777, vol. 22, No. 4, Feb. 24, 2014, 10 pages.

Wang D., et al., "Broadband and Compact Polarization Beam Splitter Based on an Asymmetrical Directional Coupler with Extra Optimizing Designs", Applied Optics, Optica Publishing Group, Oct. 17, 2019, vol. 58, No. 30, pp. 8221-8226, 2 Pages.

* cited by examiner

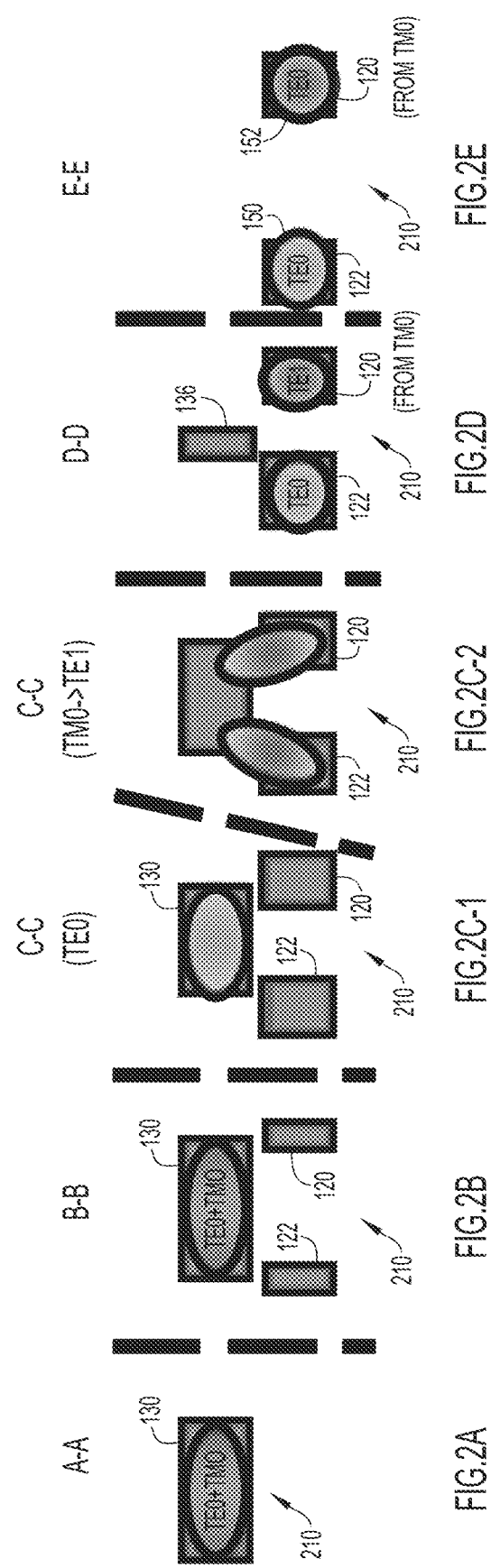

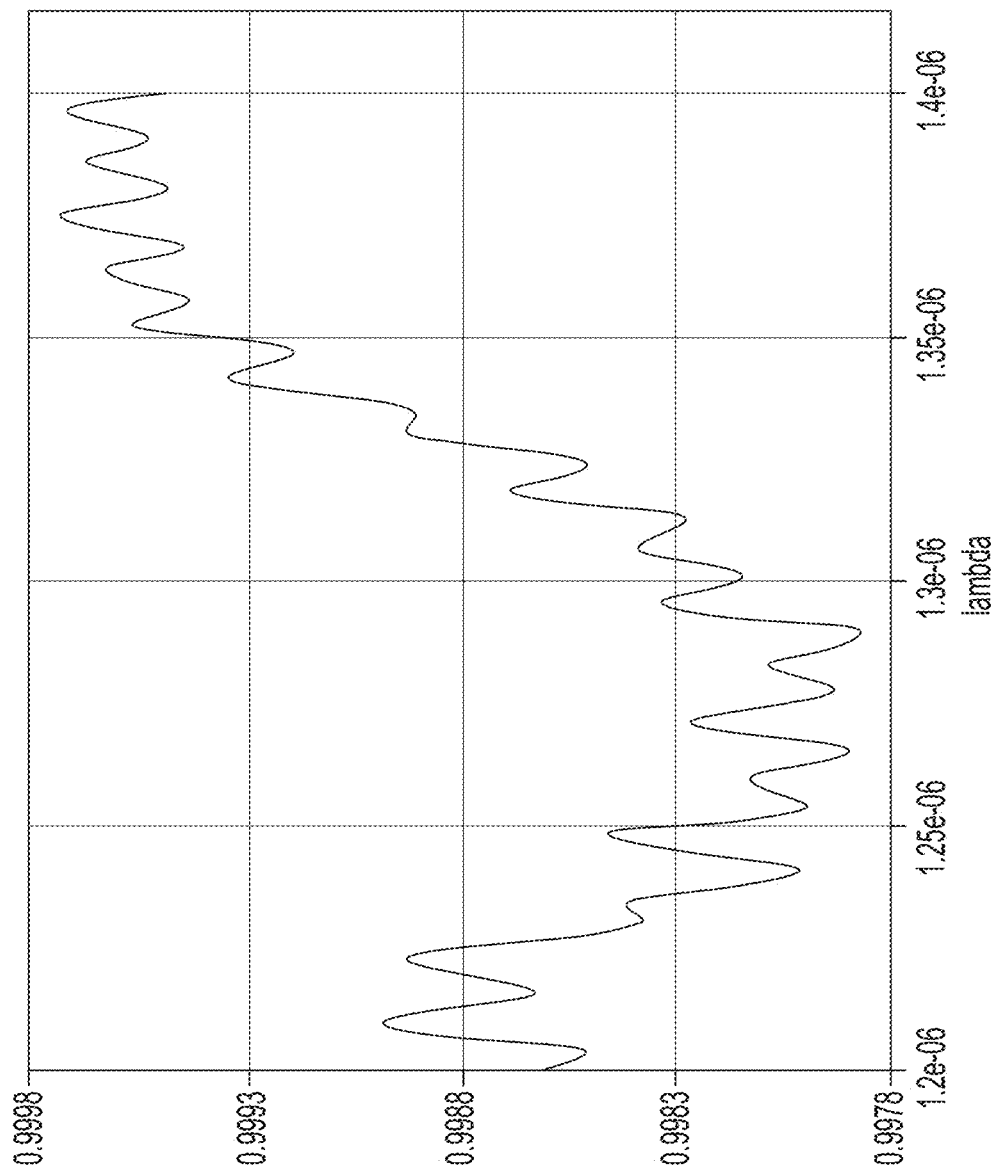

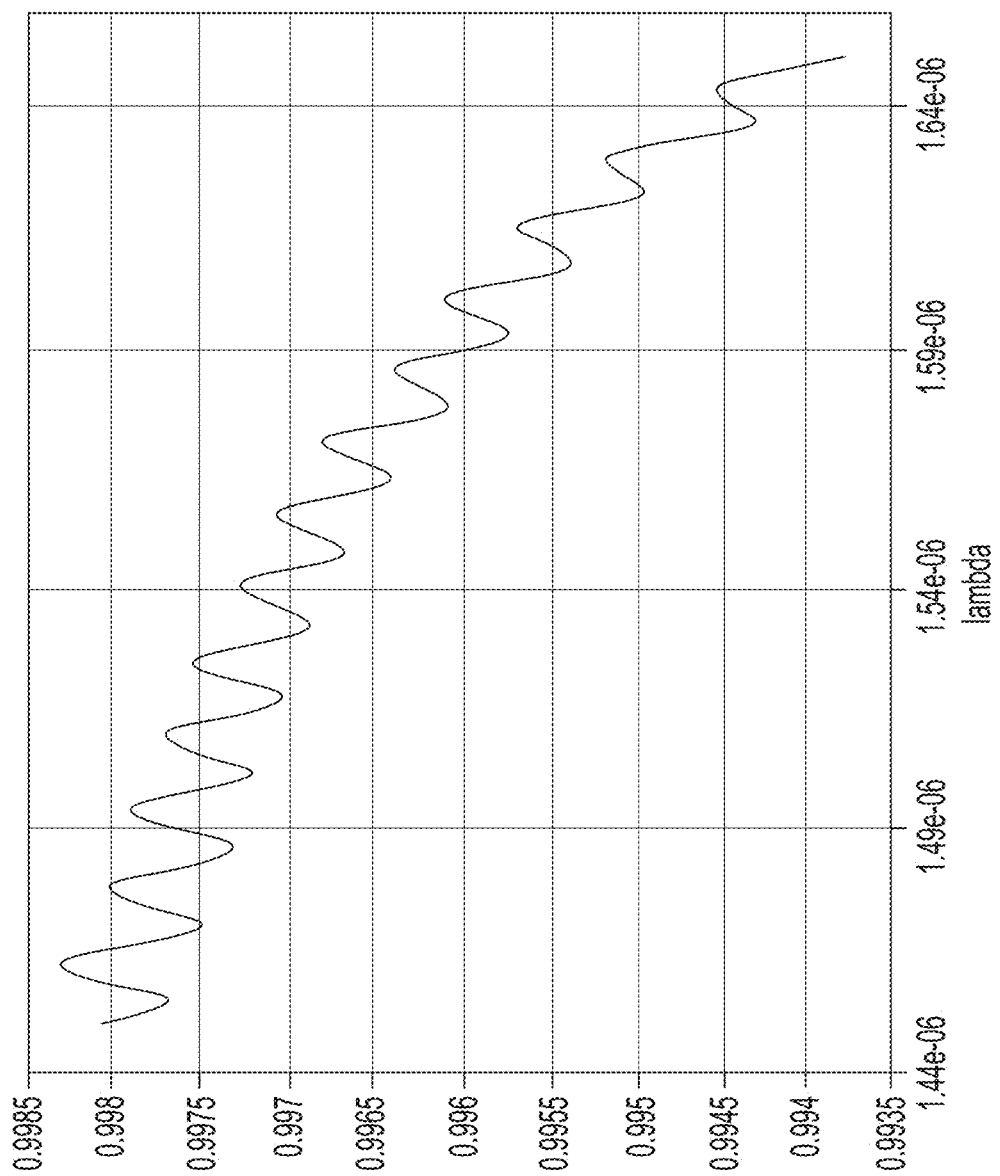

TWO LAYER POLARIZATION SPLITTER ROTATOR

TECHNICAL FIELD

Embodiments described herein are directed to a photonic polarization splitter rotator.

BACKGROUND

Silicon photonics components are polarization dependent. That is, they typically work for either single mode transverse electric (TE) or transverse magnetic (TM) modes. Single mode fiber does not maintain polarization. As a result, while the input may be one of, e.g., TE0 or TM0, the output polarization may be random, especially in a long link or over time.

Given the foregoing, polarization handling components are often used in photonic devices. For instance, a photonic receiver may use a polarization handling component to transform light, received from fiber, with unknown polarization into light with known polarization. A polarization handling component may also be used to enable Polarization Division Multiplexing (PDM), which doubles fiber capacity by transmitting signals on two orthogonal polarizations.

One well-known polarization handling component is a polarization splitter rotator (PSR), which transforms a single waveguide carrying both TE and TM optical modes into two isolated waveguides carrying TE polarized light. Functionally, a typical PSR features a rotator, which rotates TM0 mode light into TE1 mode light, followed by a mode separator (often referred to as a "modemux"). The modemux is configured, e.g., to convert the TE1 mode light into TE0 mode light of an isolated waveguide. To be effective, a PSR should be low loss. However, a PSR is one of the more lossy components of an optical receiver, limiting the receiver's overall performance.

In some designs, a PSR is implemented using crystalline silicon, poly-silicon, and silicon nitride. The silicon, especially the poly-silicon, heavily limits the overall achievable performance of the PSR due to, among other things, intrinsic scattering and absorption of the silicon (limits insertion loss), large back scattering from poly-silicon (limits return loss), and 2-photon absorption, which limits the applications in which the PSR can be used, i.e., it may be difficult to implement the PSR on a transmitter where the optical power in the waveguide is high.

BRIEF DESCRIPTION OF THE DRAWINGS

FIGS. 2A, 2B, 2C-1, 2C-2, 2D, and 2E show optical power of TE0 and TM0 mode light signals passing through respective cross-sectional regions A-A, B-B, C-C, D-D, E-E of waveguides of the polarization splitter rotator, according to an example embodiment FIGS. 3A and 3B show simulated power associated with TE0 and TM0 mode light in the O-band passing through waveguides of the polarization splitter rotator, according to an example embodiment.

FIGS. 4A and 4B show simulated power associated with TE0 and TM0 mode light in the C-band passing through waveguides of the polarization splitter rotator, according to an example embodiment.

DETAILED DESCRIPTION

Overview

Presented herein is a polarization splitter rotator (PSR) that includes a first lower waveguide and a second lower waveguide disposed on a first layer, the first lower waveguide and the second lower waveguide, in a first portion of the device, widening symmetrically as the first lower waveguide and the second lower waveguide extend from an input end of the device to an output end of the device, and, in a second portion of the device, at least the second lower waveguide widening further, asymmetrically, from the first lower waveguide, and a bus waveguide disposed on a second layer, above the first layer, at least partially overlapping portions of the first lower waveguide and the second lower waveguide.

In another embodiment, a PSR includes a substrate, a pair of waveguides arranged on a first layer, and a bus waveguide arranged on a second layer, and at least partially overlapping the pair of waveguides, wherein the pair of waveguides and the bus waveguide have substantially symmetric portions nearer to an input end of the device, and asymmetric portions closer to an output end of the device.

In still another embodiment, a method is provided. The method includes receiving a light signal at a first end of a bus waveguide that extends in a longitudinal direction and narrows to a tip towards a second end of the bus waveguide, the light signal comprising both transverse electric mode light and transverse magnetic mode light, and mode hybridizing the light signal received via the bus waveguide using a pair of waveguides that at least partially overlap with the bus waveguide and that are translated over the bus waveguide, wherein the pair of waveguides widen, symmetrically, in a first region, and widen, asymmetrically, in a second region as the pair of waveguides extend from the first end of the bus waveguide to the second end of the bus waveguide, and bend away, symmetrically, from the bus waveguide proximate the second end of the bus waveguide.

Example Embodiments

Described below is a polarization splitter rotator (PSR) that very efficiently hybridizes TM0 and TE1 mode light. At a high level, the PSR includes a pair of waveguides arranged on a first, or lower, layer. A bus waveguide is arranged on a second, or upper, layer, and at least partially overlaps the pair of waveguides. The pair of waveguides and the bus waveguide have substantially symmetric portions nearer to an input end of the PSR, and asymmetric portions closer to an output end of the PSR. In one implementation, the lower layer and the upper layer are each approximately 250 nm thick, and are separated by approximately 100 nm of cladding such as silicon dioxide. The pair of waveguides and the bus waveguide may be comprised of silicon nitride. The PSR may have an overall length less than 700 microns and has shown exceptional performance in both the O-band and the C-band.

Figure 1:
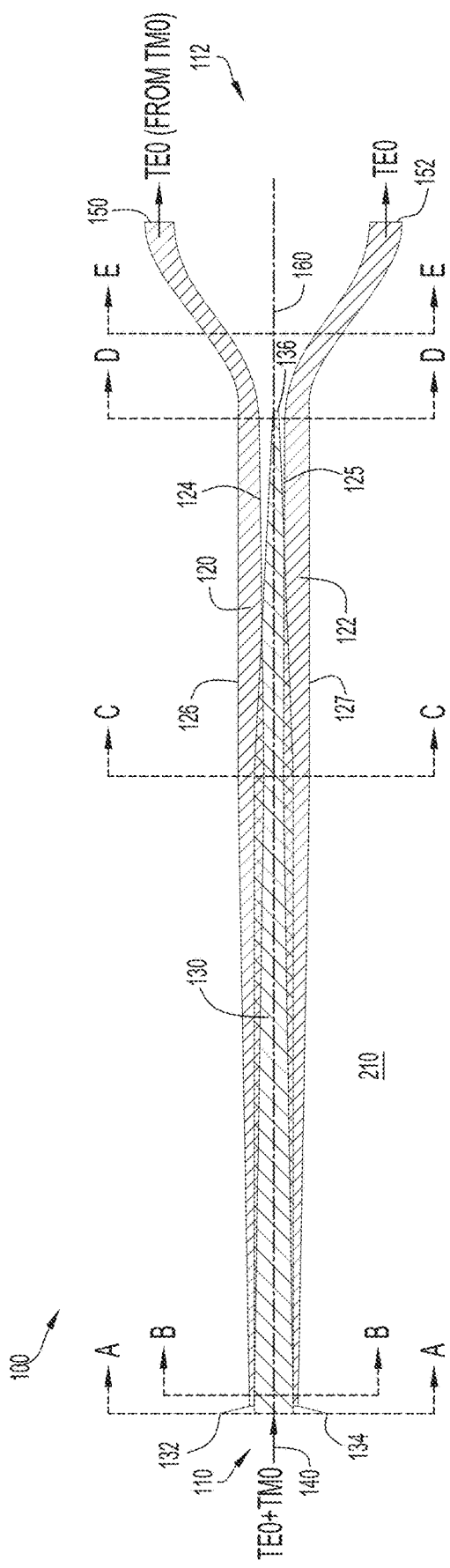
FIG. 1 shows a plan view of a polarization splitter rotator, according to an example embodiment.

Reference is now made to the figures, beginning with FIG. 1, which shows a plan view of a polarization splitter rotator 100, according to an example embodiment, and to FIGS. 2A, 2B, 2C-1, 2C-2, 2D, and 2E, which show a simulation of optical power of TE0 and TM0 mode light signals passing through respective cross-sectional regions A-A, B-B, C-C, D-D, E-E of waveguides of the polarization splitter rotator 100, according to an example embodiment. Those skilled in the art will appreciate that these denoted cross-sectional regions are merely meant to help describe the polarization splitter rotator 100 and are not meant to suggest any clear or specific boundaries between the different regions, or that any particular functionality is performed exclusively in any given region, or between any given two cross-sectional regions. Also, those skilled in the art will appreciate that the terms "lower layer" or "upper layer" are merely meant to denote a relationship between layers, not necessarily that one layer is above another layer. In other words, the final polarization splitter rotator, in use, may be oriented such that the described "upper layer" is actually below the "lower layer."

PSR 100 includes an input end 110 and an output end 112. A pair of waveguides, including a first lower waveguide 120 and a second lower waveguide 122, is disposed on/in cladding 210, such as silicon dioxide. A bus waveguide 130 is disposed on an upper layer, and at least partially overlaps first lower waveguide 120 and second lower waveguide 122. Bus waveguide 130 supports at least TE0 and TM0 guided modes. First lower waveguide 120, second lower waveguide 122, and bus waveguide 130 extend, generally, in a direction of a, central, longitudinal axis 160 from input end 110 towards output end 112.

First lower waveguide 120 and second lower waveguide 122 each comprises a tip end 132, 134, that bends in toward longitudinal axis 160 between cross-sectional regions A-A and B-B. In one implementation, first lower waveguide 120 and second lower waveguide 122 have inner edges 124, 125 that remain substantially unchanged between cross-sectional regions B-B and D-D. On the other hand, outer edges 126, 127 of first lower waveguide 120 and second lower waveguide 122 translate away from longitudinal axis 160 as first lower waveguide 120 and second lower waveguide 122 extend from cross-sectional region B-B to cross-sectional region D-D. Notably, the translation of outer edges 126, 127 between cross-sectional regions B-B and C-C may be substantially symmetrical, whereas the translation of outer edges 126, 127 between cross-sectional regions C-C and D-D may be substantially asymmetrical, with second lower waveguide 122 being wider compared to first lower waveguide 120 towards output end 112. Beyond cross-sectional region D-D and through cross-sectional region E-E, first lower waveguide 120 and second lower waveguide 122 bend away from each other and from longitudinal axis 160 providing a first output 150 and a second output 152, respectively.

In one possible implementation for the C-band, approximate distances between cross-sectional regions A-A and B-B is 10 microns, between B-B and C-C is 380 microns, between C-C and D-D is 210 microns, and between D-D and E-E is 140 microns. The maximum and minimum widths of asymmetric portions of first lower waveguide 120 and second lower waveguide 122 at cross-sectional region D-D are 1150 nm and 850 nm.

Bus waveguide 130 extends in a substantially symmetric fashion between cross-sectional regions B-B and C-C (that is, its cross-sectional dimensions remain substantially unchanged), and narrows to a tip 136 in the general location of cross-sectional region D-D. In one implementation, the taper of bus waveguide 130 is asymmetrical such that tip 136 may be closer to inner edge 125 than to inner edge 124.

The configuration of first lower waveguide 120, second lower waveguide 122, and bus waveguide 130 of PSR 100 are arranged to efficiently hybridize TM mode light into TE mode light output via output 150, and to allow TE mode light to pass through PSR 100 and be output via output 152.

More specifically, as can be seen in FIG. 2A (and FIG. 1), a light signal 140 comprising both TE0 and TM0 light is introduced at bus waveguide 130 at input end 110. As shown in FIG. 2B, first lower waveguide 120 and second lower waveguide 122 bend in towards each other and begin to overlap with bus waveguide 130. At cross-sectional region C-C, and assuming, at the moment for purposes of explanation, that only TE0 light were introduced, it can be seen in FIG. 2C-1 that the TE0 light remains in bus waveguide 130. In contrast, and assuming, again at the moment for purposes of explanation, that only TM0 light were introduced, it can be seen in FIG. 2C-2 that the TM0 light begins to be rotated into TE1 mode light that is carried by first lower waveguide 120 and second lower waveguide 122.

As shown in FIG. 2D, by the time a light signal that comprised both TM0 and TE0 mode light reaches cross-sectional region D-D, the TM0 mode light is fully hybridized into TE1 light and no light remains in bus waveguide 130, which has come to tip 136. At cross-sectional region E-E, and as shown in FIG. 2E, at output 150, first lower waveguide 120 carries TE0 mode light (from the originally-introduced TM0 mode light), and second lower waveguide 122 carries the TE0 mode light that was originally introduced into bus waveguide 130. The light which is referred to as TE1 light in waveguide 120 at section D-D is referred to as TE0 light in waveguide 120 at section E-E. The reason for the change in naming convention is that in the region of cross-section D-D waveguides are in close proximity and may have some degree of mode coupling, so the overall modes of the system of waveguides are numbered in order. In the region of cross-section E-E first lower waveguides 120 and second lower waveguide 122 have enough spatial separation that there is negligible coupling between them, and their optical modes are named as is typical for waveguides that are independent/uncoupled.

Figure 3B:
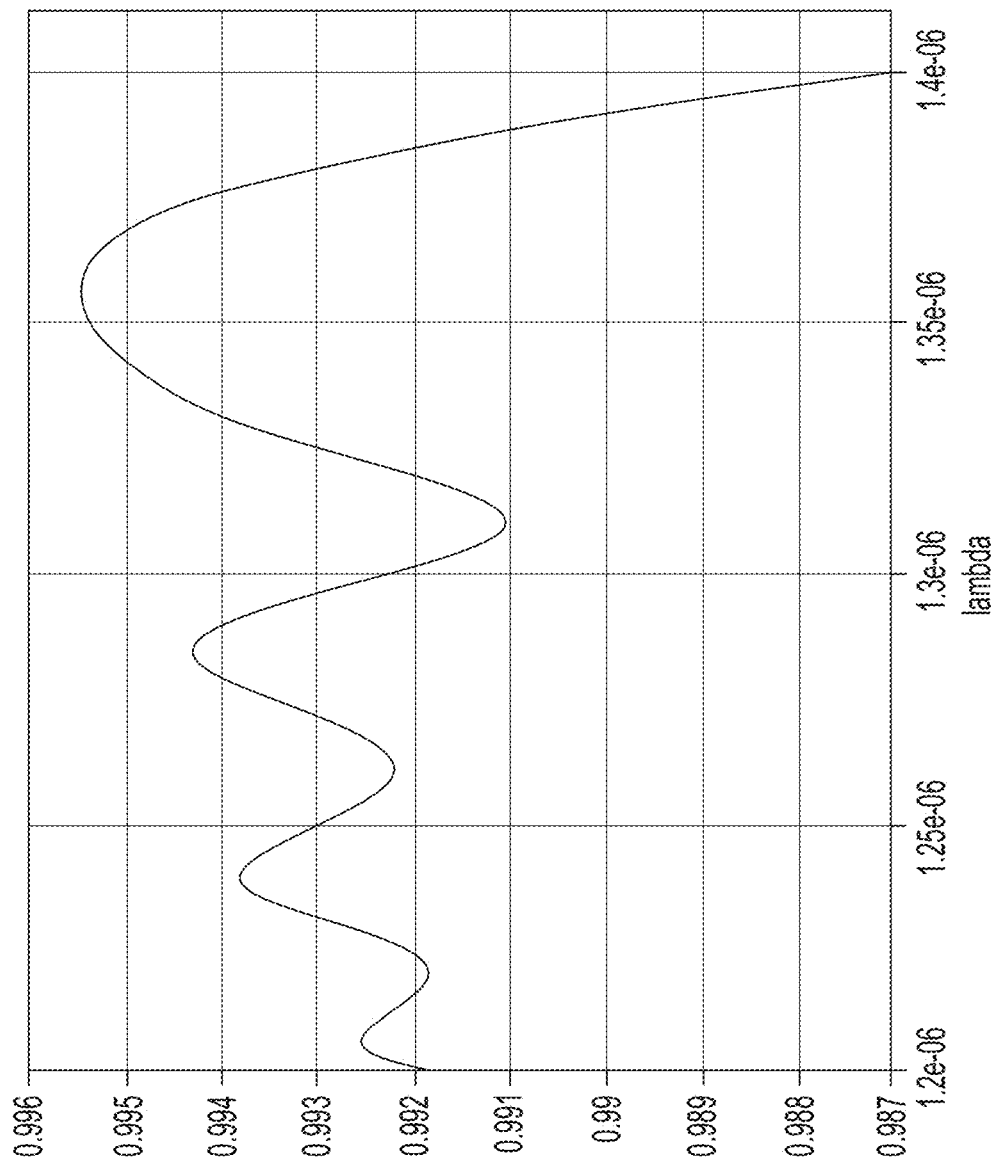

FIGS. 3A and 3B show simulated power associated with TE0 and TM0 mode light in the O-band passing through waveguides of PSR 100, according to an example embodiment. As shown in FIG. 3A, for a 1 mm long version PSR 100, there is >30 db extinction and about 0.01 dB insertion loss at 1200-1400 nm for TE0 light in second lower waveguide 122. As shown in FIG. 3B, for a 1 mm long version of PSR 100, there is about 25 dB extinction and about 0.04 dB insertion loss for TM0 mode light (hybridized to TE0) in the first lower waveguide 120.

Figure 4B:
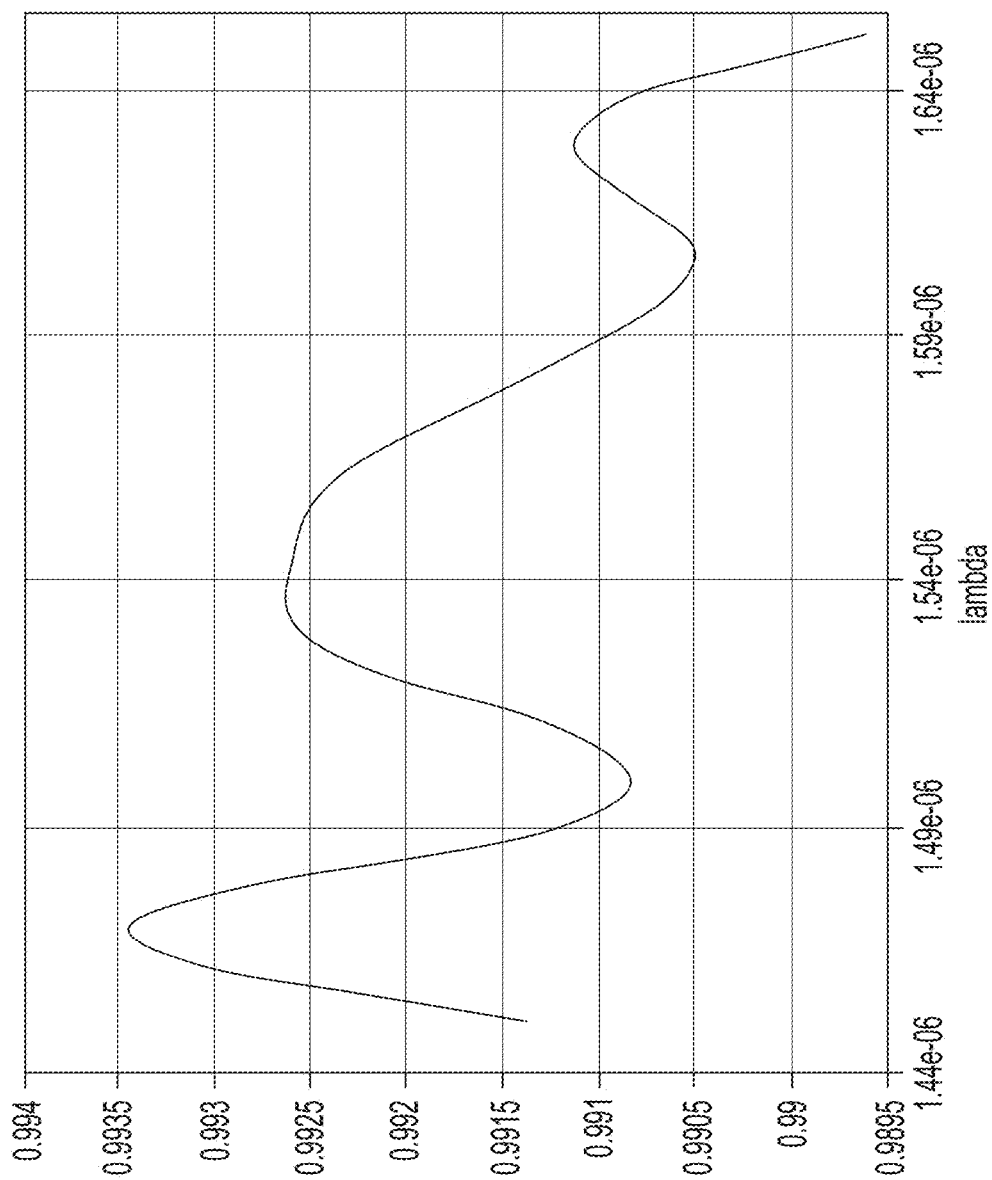

FIGS. 4A and 4B show simulated power associated with TE0 and TM0 mode light in the C-band passing through waveguides of the polarization splitter rotator 100, according to an example embodiment. As shown in FIG. 4A, for a 1 mm long version of PSR 100, there is about 22 db extinction and about 0.03 dB insertion loss at 1450-1650 nm for TE0 light in second lower waveguide 122. As shown in FIG. 4B, for a 1 mm long version of PSR 100, there is about 23 dB extinction and about 0.04 dB insertion loss for TM0 mode light (hybridized to TE0) in the first lower waveguide 120.

Figure 5:
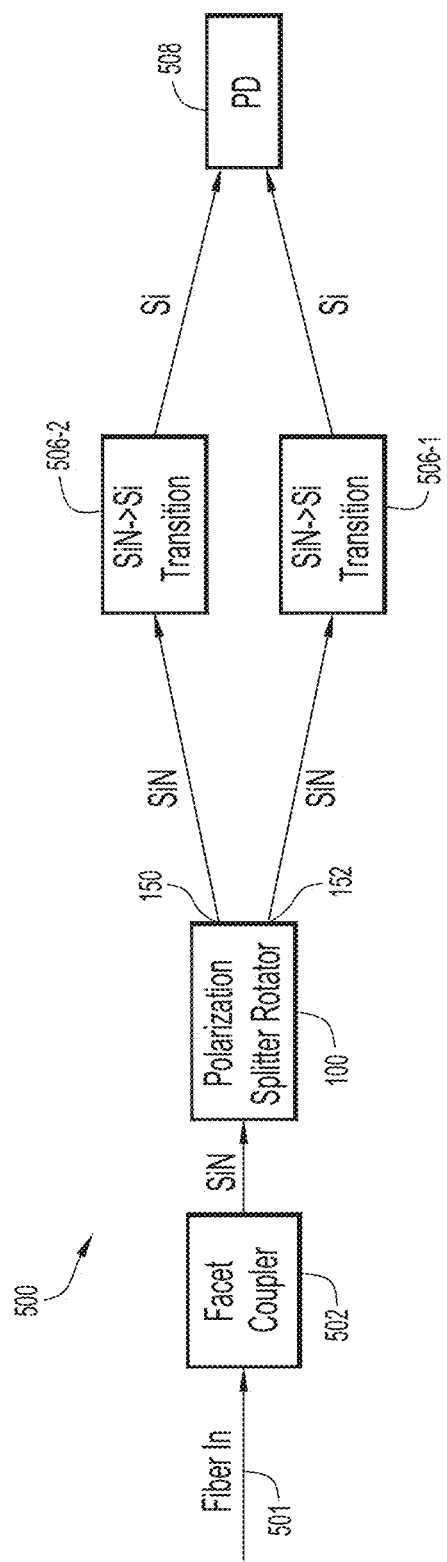
FIG. 5 shows the polarization splitter rotator used in one possible implementation according to an example embodiment.

FIG. 5 shows PSR 100 used in one possible implementation according to an example embodiment. More specifically, FIG. 5 is block diagram of a receiver 500 use case for PSR 100, according to an example embodiment. As shown, a facet coupler 502 receives a fiber optic cable 501 and delivers a mixed TE0/TM0 optical signal via a silicon nitride (SiN) waveguide to PSR 100. PSR 100, in turn, rotates the received TM0 mode light to TE1 mode light and modemuxes the TE1 light into TE0 light, passes TE0 mode light, and outputs TE0 mode light on each of its first output 150 and second output 152, via silicon nitride waveguides to SiN→Silicon (Si) transitions 506-1, 506-2, respectively, and then outputs thereof are provided to a photodetector (PD) 508.

In some embodiments there may be a polarization mode dispersion induced prior to the output of the polarization splitter rotator 100. This can occur for example due to the difference in group index of TE0 and TM0 light in the facet coupler 502, polarization splitter rotator 100, or waveguide connecting these two components. In this case, it may be advantageous to compensate the polarization mode dispersion so that the group delay for TE0 and TM0 input light between the input to facet coupler 502 and input to PD 508 are set equal to one another. Since PSR 100 substantially separates input TE0 and TM0 light to first output 150 and second output 152 utilizing asymmetry between cross-sections C-C and D-D shown in FIGS. 1 and 2, this compensation can be achieved by introducing a length difference between the waveguides connecting first output 150 to PD 508, and the waveguides connecting second output 152 to PD 508.

Figure 6:
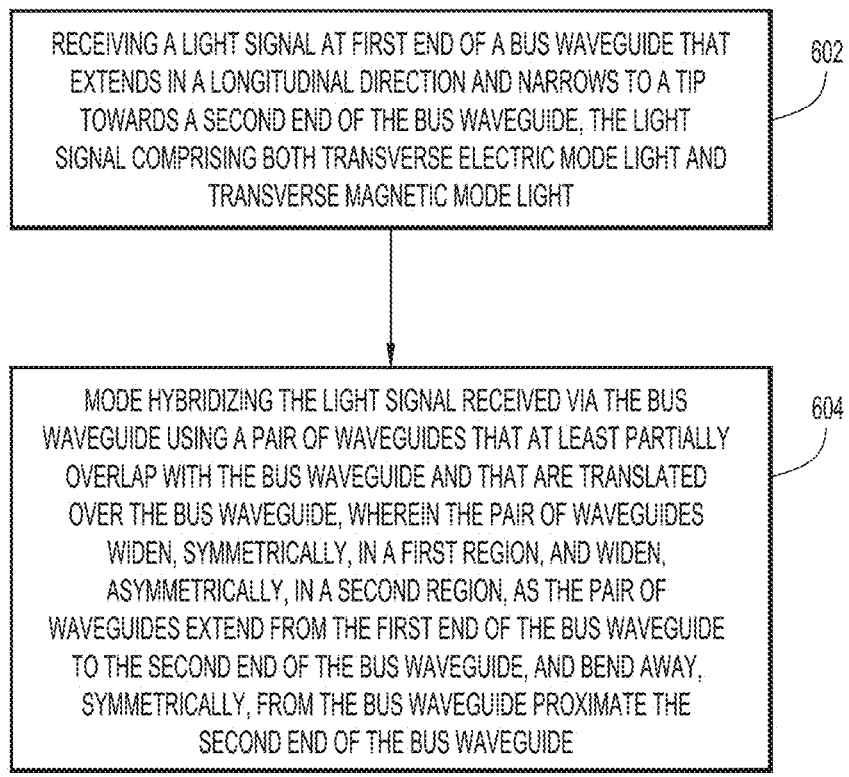
FIG. 6 is a flowchart showing a series of operations for processing light with a polarization splitter rotator, according to an example embodiment.

FIG. 6 is a flowchart showing a series of operations for processing light with a polarization splitter rotator, according to an example embodiment. The method includes, at 602, receiving a light signal at a first end of a bus waveguide that extends in a longitudinal direction and narrows to a tip towards a second end of the bus waveguide, the light signal comprising both transverse electric mode light and transverse magnetic mode light, and, at 604, mode hybridizing the light signal received via the bus waveguide using a pair of waveguides that at least partially overlap with the bus waveguide and that are translated over the bus waveguide, wherein the pair of waveguides widen, symmetrically, in a first region, and widen, asymmetrically, in a second region, as the pair of waveguides extend from the first end of the bus waveguide to the second end of the bus waveguide, and bend away, symmetrically, from the bus waveguide proximate the second end of the bus waveguide.

It is noted that bus waveguide 130, first lower waveguide 120, and second lower waveguide 122 may be made of dielectric materials such as SiN or SiON (silicon oxynitride), or crystalline materials such as Si or LiNbO3 or InP. Bus waveguide 130, first lower waveguide 120, and second lower waveguide 122 may be composed of identical or different materials. Bus waveguide 130, first lower waveguide 120, and second lower waveguide 122 may have identical or different thicknesses.

Also, it is noted that polarization splitter rotator 100 can operate in either direction. From left to right in FIG. 1, it operates as a demultiplexer (two modes on one waveguide to one mode on each of two waveguides). From right to left in FIG. 1, it operates as a multiplexer (one mode on each of two waveguides to two modes on one waveguide.

VARIATIONS AND IMPLEMENTATIONS

Embodiments described herein may include or be part of one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s)

and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In sum, a device is provided and includes a first lower waveguide and a second lower waveguide disposed on a first layer, the first lower waveguide and the second lower waveguide, in a first portion of the device, widening symmetrically as the first lower waveguide and the second lower waveguide extend from an input end of the device to an output end of the device, and, in a second portion of the device, at least the second lower waveguide widening further, asymmetrically, from the first lower waveguide, and a bus waveguide disposed on a second layer, above the first layer, at least partially overlapping portions of the first lower waveguide and the second lower waveguide.

The bus waveguide may taper to a point towards the output end of the device.

In the first portion of the device, the cross-sectional dimensions of the bus waveguide may remain substantially unchanged.

In the second portion of the device, the bus waveguide may translate away from a longitudinal axis of the device toward the output end.

The bus waveguide may be configured to carry transverse electric optical mode light and transverse magnetic optical mode light.

The bus waveguide may be comprised of silicon nitride.

At the output end of the device, a width of the second lower waveguide may be greater than a width of the first lower waveguide.

The first lower waveguide and the second lower waveguide may be configured to interact with the bus waveguide to hybridize transverse magnetic mode light, introduced into the bus waveguide, to transverse electric mode light.

At least in the first portion of the device, inner edges of the first lower waveguide and the second lower waveguide may remain substantially unchanged as the first lower waveguide and the second lower waveguide extend from the input end to the output end.

At least in the first portion of the device, outer edges of the first lower waveguide and the second lower waveguide may translate away from a longitudinal axis of the device as the first lower waveguide and the second lower waveguide extend from the input end to the output end.

Ends of the first lower waveguide and the second lower waveguide, towards the input end, may bend in toward the bus waveguide as the first lower waveguide and the second lower waveguide extend from the input end to the output end.

The first lower waveguide and the second lower waveguide may be comprised of silicon nitride.

In another embodiment, a device includes a pair of waveguides arranged on a first layer; and a bus waveguide arranged on a second layer, and at least partially overlapping the pair of waveguides, wherein the pair of waveguides and the bus waveguide have substantially symmetric portions nearer to an input end of the device, and asymmetric portions closer to an output end of the device.

The bus waveguide may be configured to carry transverse electric optical mode light and transverse magnetic optical mode light.

The bus waveguide and the pair of waveguides may be comprised of silicon nitride.

In at least a first portion of the device, inner edges of the pair of waveguides may remain substantially unchanged as the pair of waveguides extend from the input end to the output end, outer edges of the pair of waveguides may translate away from a longitudinal axis of the bus waveguide as the pair of waveguides extend from the input end to the output end, and the bus waveguide may narrow to a tip toward the output end of the device.

A method is also provided and includes receiving a light signal at a first end of a bus waveguide that extends in a longitudinal direction and narrows to a tip towards a second end of the bus waveguide, the light signal comprising both transverse electric mode light and transverse magnetic mode light, and mode hybridizing the light signal received via the bus waveguide using a pair of waveguides that at least partially overlap with the bus waveguide and that are translated over the bus waveguide, wherein the pair of waveguides widen, symmetrically, in a first region, and widen, asymmetrically, in a second region, as the pair of waveguides extend from the first end of the bus waveguide to the second end of the bus waveguide, and bend away, symmetrically, from the bus waveguide proximate the second end of the bus waveguide.

The method may further include mode hybridizing the transverse magnetic mode light to transverse electric mode light.

The method may further include outputting transverse electric mode light from a first waveguide of the pair of waveguides, the transverse electric mode light having been hybridized from the transverse magnetic mode light.

In the method, the bus waveguide and the pair of waveguides may be comprised of silicon nitride.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A device, comprising:
   a first lower waveguide and a second lower waveguide disposed on a first layer, the first lower waveguide and the second lower waveguide, in a first portion of the device, widening symmetrically as the first lower waveguide and the second lower waveguide extend from an input end of the device to an output end of the device, and, in a second portion of the device, at least the second lower waveguide widening further, asymmetrically, with respect to the first lower waveguide with an outer edge of the second lower waveguide that translates away from an inner edge of the second lower waveguide, wherein the inner edge of the second lower waveguide remains substantially unchanged from a position of the inner edge of the second lower waveguide in the first portion of the device; and
   a bus waveguide disposed on a second layer, above the first layer, at least partially overlapping portions of the first lower waveguide and the second lower waveguide.

2. The device of claim 1, wherein the bus waveguide tapers to a point towards the output end of the device.

3. The device of claim 1, wherein, in the first portion of the device, cross-sectional dimensions of the bus waveguide remain substantially unchanged.

4. The device of claim 1, wherein, in the second portion of the device, the bus waveguide translates away from a longitudinal axis of the device toward the output end.

5. The device of claim 1, wherein the bus waveguide is configured to carry transverse electric optical mode light and transverse magnetic optical mode light.

6. The device of claim 1, wherein the bus waveguide is comprised of silicon nitride.

7. The device of claim 1, wherein, at the output end of the device, a width of the second lower waveguide is greater than a width of the first lower waveguide.

8. The device of claim 1, wherein the first lower waveguide and the second lower waveguide are configured to interact with the bus waveguide to hybridize transverse magnetic mode light, introduced into the bus waveguide, to transverse electric mode light.

9. The device of claim 1, wherein, at least in the first portion of the device, inner edges of the first lower waveguide and the second lower waveguide remain substantially unchanged as the first lower waveguide and the second lower waveguide extend from the input end to the output end.

10. The device of claim 1, wherein, at least in the first portion of the device, outer edges of the first lower waveguide and the second lower waveguide translate away from a longitudinal axis of the device as the first lower waveguide and the second lower waveguide extend from the input end to the output end.

11. The device of claim 1, wherein ends of the first lower waveguide and the second lower waveguide, towards the input end, bend in toward the bus waveguide as the first lower waveguide and the second lower waveguide extend from the input end to the output end.

12. The device of claim 1, wherein the first lower waveguide and the second lower waveguide are comprised of silicon nitride.

13. A device, comprising:
   a pair of waveguides arranged on a first layer; and
   a bus waveguide arranged on a second layer, and at least partially overlapping the pair of waveguides,
   wherein the pair of waveguides and the bus waveguide have substantially symmetric portions nearer to an input end of the device, and asymmetric portions closer to an output end of the device,
   wherein the bus waveguide translates away from a longitudinal axis of the device towards the output end of the device, and
   wherein a first waveguide of the pair of waveguides, towards the output end of the device, widens asymmetrically, with respect to a second waveguide of the pair of waveguides, by having an outer edge of the first waveguide of the pair of waveguides that translates away from an inner edge of the first waveguide of the pair of waveguides.

14. The device of claim 13, wherein the bus waveguide is configured to carry transverse electric optical mode light and transverse magnetic optical mode light.

15. The device of claim 13, wherein the bus waveguide and the pair of waveguides are comprised of silicon nitride.

16. The device of claim 13, wherein, in at least a first portion of the device, inner edges of the pair of waveguides remain substantially unchanged as the pair of waveguides extend from the input end to the output end, outer edges of the pair of waveguides translate away from a longitudinal axis of the bus waveguide as the pair of waveguides extend from the input end to the output end, and the bus waveguide narrows to a tip toward the output end of the device.

17. A method comprising:
   receiving a light signal at a first end of a bus waveguide of a photonic device that extends in a longitudinal direction and narrows to a tip towards a second end of the bus waveguide, wherein the bus waveguide translates away from a longitudinal axis of the photonic device towards the second end of the bus waveguide, the light signal comprising both transverse electric mode light and transverse magnetic mode light; and mode hybridizing the light signal received via the bus waveguide using a pair of waveguides that at least partially overlap with the bus waveguide and that are translated over the bus waveguide, wherein the pair of waveguides widen, symmetrically, in a first region, and widen, asymmetrically, in a second region, as the pair of waveguides extend from the first end of the bus waveguide to the second end of the bus waveguide, and bend away from the bus waveguide proximate the second end of the bus waveguide; and wherein a first waveguide of the pair of waveguides, towards the second end of the bus waveguide, widens asymmetrically, with respect to a second waveguide of the pair of waveguides, by having an outer edge of the first waveguide of the pair of waveguides that translates away from an inner edge of the first waveguide of the pair of waveguides.

18. The method of claim 17, further comprising mode hybridizing the transverse magnetic mode light to transverse electric mode light.

19. The method of claim 17, further comprising outputting transverse electric mode light from the first waveguide of the pair of waveguides, the transverse electric mode light having been hybridized from the transverse magnetic mode light.

20. The method of claim 17, wherein the bus waveguide and the pair of waveguides are comprised of silicon nitride.

* * * * *